(12) United States Patent
Lee et al.

(10) Patent No.: US 8,864,342 B2
(45) Date of Patent: Oct. 21, 2014

(54) LIGHTING DEVICE AND DISPLAY DEVICE HAVING THE SAME

(75) Inventors: Gwang-Pil Lee, Suwon-si (KR); Sil-Kuy Lim, Hwaseong-si (KR); Jung-Soo Lee, Suwon-si (KR); Ho-Yeon Lee, Gwangmyeong-si (KR); Dong-Sub Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 337 days.

(21) Appl. No.: 13/298,593

(22) Filed: Nov. 17, 2011

(65) Prior Publication Data
US 2012/0230037 A1    Sep. 13, 2012

(30) Foreign Application Priority Data

Mar. 8, 2011    (KR) .......................... 10-2011-0020612

(51) Int. Cl.
*F21V 7/22*    (2006.01)
*F21V 8/00*    (2006.01)
*G02F 1/1335*    (2006.01)
*G02F 1/1333*    (2006.01)

(52) U.S. Cl.
CPC ........ *G02F 1/133605* (2013.01); *G02B 6/0055* (2013.01); *G02F 2001/133314* (2013.01); *G02B 6/0088* (2013.01)
USPC ................... 362/296.04; 362/609; 362/97.1; 362/633; 362/634; 359/838; 359/883

(58) Field of Classification Search
USPC ........... 362/97.1–97.4, 609, 296.04; 359/838, 359/883
See application file for complete search history.

(56) References Cited

U.S. PATENT DOCUMENTS

| | | | |
|---|---|---|---|
| 6,474,845 B1 | 11/2002 | Mabe et al. | |
| 7,857,470 B2 | 12/2010 | Nishi et al. | |
| 8,373,829 B2* | 2/2013 | Hara et al. | ...................... 349/113 |
| 8,408,775 B1* | 4/2013 | Coleman | ....................... 362/615 |
| 8,434,885 B2* | 5/2013 | Hamasaki et al. | ........... 362/97.1 |
| 2005/0168997 A1 | 8/2005 | Lin | |
| 2007/0244224 A1 | 10/2007 | Hiruma et al. | |
| 2010/0053785 A1 | 3/2010 | Nishi et al. | |

FOREIGN PATENT DOCUMENTS

| | | |
|---|---|---|
| JP | 63034513 A | 2/1988 |
| JP | 9-262927 A | 10/1997 |
| JP | 2006-284880 A | 10/2006 |
| JP | 2008-304795 A | 12/2008 |
| JP | 2009-025716 A | 2/2009 |
| KR | 10-2005-0104787 A | 11/2005 |
| KR | 10-2007-0051784 A | 5/2007 |
| KR | 10-2008-0017999 A | 2/2008 |
| KR | 10-2008-0048269 A | 6/2008 |
| KR | 10-0936373 B1 | 1/2010 |

* cited by examiner

*Primary Examiner* — Anabel Ton
(74) *Attorney, Agent, or Firm* — Jefferson IP Law, LLP

(57) ABSTRACT

A display device and a lighting device are provided. The display device includes a display element for outputting an image according to a provided image signal, a frame disposed on a rear surface of the display element, and a reflection layer formed on the frame and positioned between the display device and the frame, the reflection layer being a coating layer formed using a paint including at least one of silver and aluminum. When the backlighting device of the display device is configured, a reflection plate where deposition films and a reflection layer made of a metal component are deposited is not required and the reflection layer is formed on the frame by using a paint having at least one of silver and aluminum as its main components, thereby simplifying a manufacturing process, and contributing to reducing the thickness of the display device.

19 Claims, 2 Drawing Sheets understand# LIGHTING DEVICE AND DISPLAY DEVICE HAVING THE SAME

PRIORITY

This application claims the benefit under 35 U.S.C. §119 (a) of a Korean patent application filed in the Korean Intellectual Property Office on Mar. 8, 2011 and assigned Serial No. 10-2011-0020612, the entire disclosure of which is hereby incorporated by reference.

BACKGROUND OF THE INVENTION

1. Field of the Invention

The present invention relates to a display device mounted on a portable terminal. More particularly, the present invention relates to a lighting device which facilitates reduction in the thickness of a backlighting device and a display device including the lighting device.

2. Description of the Related Art

Generally, the term "display device" refers to a device for presenting a screen with a provided image signal. The display device has been widely used in daily life for not only portable terminals, such as cellular phones, Portable Multimedia Players (PMPs), etc., but also electric appliances, such as navigation systems for vehicles, televisions (TVs), laundry machines, refrigerators, etc.

With the common use of a flat-panel display device such as a Liquid Crystal Display (LCD), the display device can now be mounted on a small-size device such as a portable terminal. Recently, a combination of a touch screen panel and a display device implements a virtual keypad on a screen in place of a physical keypad of the portable terminal.

Since the flat-panel display device cannot emit light itself, the display device visually presents a screen implemented through the display device with light provided from a separately installed light source. The flat-panel display device, at its early stages of development, displayed a simple character or symbol with combinations of black and white, such that lighting can be sufficiently provided by installing a point light source at a side of the display device.

Recently, however, as a television or a monitor for a computer, which uses a flat-panel display device, has been popularized and a multimedia service using a portable terminal is also rapidly increasing, there is a limitation in providing lighting for the flat-panel type display device with a point light source which has a large deviation in backlighting according to an installation position. As a result, effort has been exerted to provide lighting uniformly over the entire area of the display device by using a light guide plate or a sheet diffuser which converts a point light source into a surface light source. In addition, a reflection plate for efficient use of light generated from the light source is also mounted in the flat-panel type display device.

FIG. 1 is an exploded perspective view of a display device according to the related art. The display device 10 implements an image based on a provided image signal through a flat-panel display device 21, and a backlighting device including a light source (not shown) provides lighting to allow a user to view the image implemented through the flat-panel display device 21. The backlighting device includes a light guide plate 12, a sheet diffuser 13, and a prism sheet 14 which are disposed on a frame 11, and the light source (not shown) is disposed on at least a side of the light guide plate 12. A plurality of light sources may be installed in an actual product according to a size of the flat-panel display device 21 or the like.

The frame 11 may be provided to enclose a back surface and side surfaces of the flat-panel display device 21 while maintaining the shapes of the light guide plate 12, the sheet diffuser 13, and the prism sheet 14.

The light guide plate 12 allows the light provided from the light source to be radiated over the entire area of the flat-panel display device 21. In other words, a line light source radiated from the light source is converted into a surface light source through the light guide plate 12.

The sheet diffuser 13 uniformly adjusts the light radiated from the light guide plate 12 toward the flat-panel display device 21 over the entire area of the flat-panel display device 21. The light passing through the sheet diffuser 13 is refracted in various directions, thereby passing through the prism sheet 14.

The prism sheet 14 converts side light, which passes through the sheet diffuser 13 and then goes in an inclined direction with respect to the flat-panel display device 21, into front light. That is, the light passing through the prism sheet 14 enters the prism sheet 14 perpendicular to a surface of the flat-panel display device 21.

The backlighting device described above is adhered to a back surface of the flat-panel display device 21 through a separate adhesive sheet (not shown).

The light radiated from the light guide plate 12 also goes to a back surface which does not face the flat-panel display device 21, degrading lighting efficiency. Therefore, the backlighting device preferably includes a reflection plate 15 on the back surface of the light guide plate 12.

The reflection plate 15 forms a reflection layer by depositing a metal component such as aluminum on a surface of a deposition film. In this case, since it is difficult to secure a sufficient refractive index only with a general metal component, deposition films on which reflection layers are formed are laminated and thermally compressed, after which thickness is reduced by a stretching process and a surface area is expanded, thus completing the reflection plate 15. The completed reflection plate 15 is adhered to the back surface of the light guide plate 12 or the frame 11 through a separate adhesive tape 16.

However, in the backlighting device of the related art, the reflection plate has disadvantages of a complex manufacturing process and a high possibility of a crack being generated in the reflection layer or the deposition film. Moreover, the reflection plate is manufactured by laminating the plurality of deposition films and then performing the stretching process, such that to dispose the reflection plate in an actual product, a separate cutting process and an adhering process using an adhesive tape are required. As a result, the assembly process of the reflection plate to the backlighting device as well as the manufacturing process of the reflection plate is cumbersome. Moreover, the thickness of the adhesive tape as well as the thickness of the reflection plate including the deposition films hinders reducing the thickness of the display device.

The above information is presented as background information only to assist with an understanding of the present disclosure. No determination has been made, and no assertion is made, as to whether any of the above might be applicable as Prior Art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a display device including a backlighting device, which contributes to simplifying a manufacturing process.

Another aspect of the present invention is to provide a display device including a backlighting device, which contributes to reducing the thickness of the display device, and thereby reducing the thickness of a portable terminal in which the display device is mounted.

According to an aspect of the present invention, a display device is provided. The device includes a display element for outputting an image according to a provided image signal, a frame disposed on a rear surface of the display element, and a reflection layer formed on the frame and positioned between the display device and the frame, the reflection layer being a coating layer formed using a paint including at least one of silver and aluminum.

The frame may be formed of a plate using a metal material or an injection-molded product.

The display device may further include a bottom primer layer interposed between the frame and the reflection layer, and in this case, the bottom primer layer may be formed using a paint including at least one of acryl, urethane, silicon, epoxy, styrene, polyester, and high polymer polyester.

The display device may further include an ultraviolet (UV)-curing layer interposed between the bottom primer layer and the reflection layer.

The display device may further include a top coating layer formed on the reflection layer and positioned between the display element and the reflection layer.

The display device may further include an anti-tarnish layer coated on a surface of the reflection layer.

The display device may further include a silicon particle layer formed on the reflection layer and positioned between the display element and the reflection layer.

The display device may further include a bottom primer layer interposed between the frame and the reflection layer, an ultraviolet (UV)-curing layer interposed between the bottom primer layer and the reflection layer, a top coating layer formed on the reflection layer and positioned between the display element and the reflection layer, and an anti-tarnish layer coated on a surface of the reflection layer, in which at least one of the bottom primer layer, the UV-curing layer, the top coating layer, and the anti-tarnish layer may be formed using a paint to which at least one of a pigment, a dye, and a quencher are added.

Meanwhile, it can be easily understood by those of ordinary skill in the art that the reflection layer may be applicable to not only the display device, but also a lighting device used in daily life, for example, indoor lighting, a street lamp, a vehicle's head lamp, etc.

When the backlighting device of the display device is configured, a conventional reflection plate where deposition films and a reflection layer made of a metal component are deposited is not required and a reflection layer may be formed on a frame by using a paint having at least one of silver and aluminum as its main components, thereby simplifying a manufacturing process. In other words, it is unnecessary to deposit the metal component onto the deposition films to form the reflection layer or to deposit and stretch the deposition films where the reflection layer is formed, thus simplifying the manufacturing process.

Furthermore, the reflection layer may be directly formed on the frame disposed on the rear surface of the display device, thereby removing a need for cutting or adhesion of the reflection plate and thus contributing to reduction of the thickness of the display device, and thereby contributing to reduction of the thickness of a device having the display device mounted thereon, such as a portable terminal, due to the deposition films or an adhesive tape.

In addition, the reflection layer whose manufacturing process is simplified and whose thickness is easy to reduce can be applied to indoor lighting, a street lamp, a vehicle's head lamp, and so forth, thereby reducing the manufacturing cost of a device or equipment for which lighting is used.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of an exemplary embodiment of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiment of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions will be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
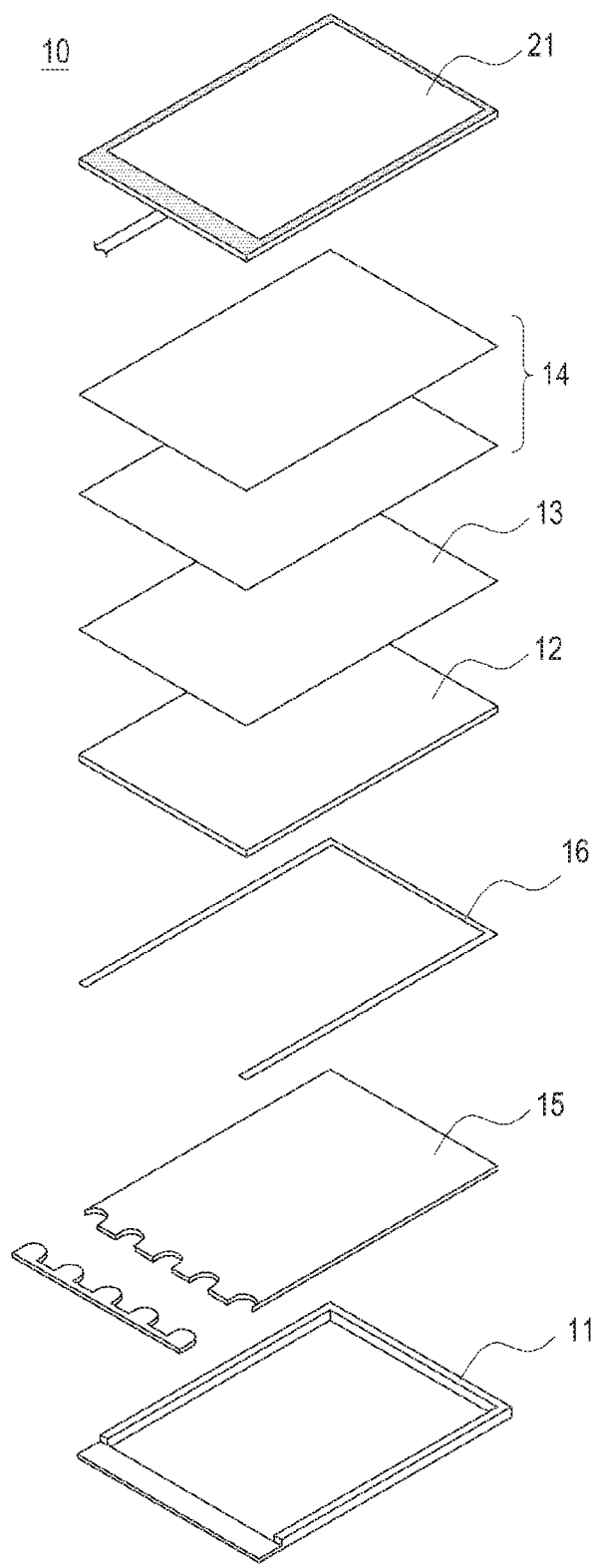
FIG. 1 is an exploded perspective view of a display device according to the related art.
Figure 2:
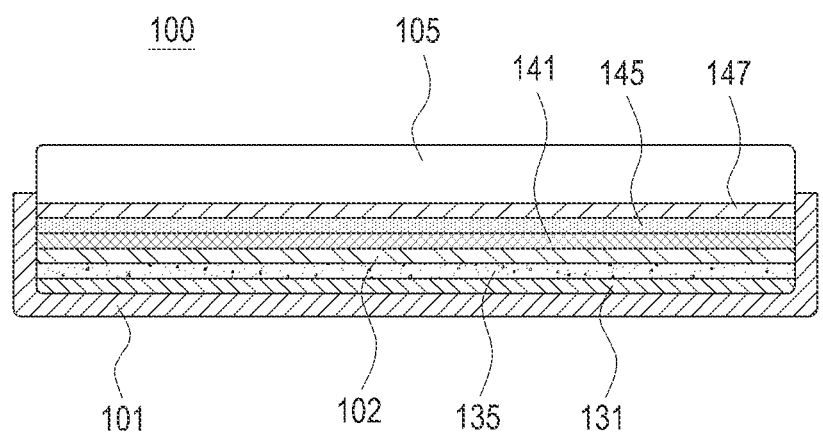
FIG. 2 is a cross-sectional view of a display device according to an exemplary embodiment of the present invention.

FIG. 2 is a cross-sectional view of a display device according to an exemplary embodiment of the present invention. According to exemplary embodiments of the present invention, the display device shown in FIG. 1 may include additional and/or different components, or omit any number of the components shown in FIG. 1. Similarly, the functionality of two or more components may be integrated into a single component.

Referring to FIG. 2, a display device 100 according to an exemplary embodiment of the present invention includes a backlighting device in which a reflection layer 102 may be formed on a frame 101 disposed on a back surface of a display element 105. The backlighting device may include a light guide plate, a sheet diffuser, a prism sheet, and so forth, but such a configuration can be easily understood by those of ordinary skill in the art and thus will not be described in detail herein.

The display element 105, may be implemented with a flat-panel display element, and may be manufactured with various elements such as a Liquid Crystal Display (LCD) element, a Thin Film Transistor (TFT) LCD element, an Organic Light Emitting Diode (OLED) element, etc. Since the display element 105 generally cannot emit light by itself or cannot generate enough light to clearly implement a screen color, the display device 100 includes the separate backlighting device.

The backlighting device includes the frame 101 provided on the back surface of the display device 105 to enclose at least the back surface of the display device 105, and the reflection layer 102 formed on a surface of the frame 101.

The frame 101 provides a structure, although not shown, for installing a light source or a light guide plate of the backlighting device. The frame 101 may be coupled to the display element 105 to protect the display element 105. The frame 101 may be manufactured by processing a plate using a metal material or manufactured with an injection-molded product. In other words, the frame 101 may be manufactured with a plate using a metal material such as iron, aluminum, magnesium, or the like, or with an injection-molded product using a synthetic resin material such as polycarbonate resin, ABS resin, natural rubber, or the like.

The reflection layer 102 includes a coating layer formed by coating a paint onto a surface of the frame 101. The paint for the reflection layer 102 includes silver and aluminum as its main components, such that the surface of the frame 101 may be coated by spraying the paint onto the surface of the frame 101, and the paint may be cured by thermal curing, thus completing the reflection layer 102. The reflection layer 102 may be formed to have a thickness of at least 20 μm, thus securing a refractive index equal to or higher than that of a reflection plate of the related art. When the refection layer 102 is formed to have a thickness of 60-120 μm, its refractive index may be further improved and its durability may be improved.

Table 1 shows a comparison between a refractive index of a reflection plate of the related art having deposition films and a refractive index of a reflection layer according to an exemplary embodiment of the present invention. As can be seen in Table 1, the refractive index of the reflection layer according to the present exemplary embodiment of present invention may be equal to that of the reflection plate of the related art in a visible light spectrum.

TABLE 1

| Visible Light Wavelength | 400 mm | 500 mm | 600 mm | 700 mm |
|---|---|---|---|---|
| Reflection Plate Having Deposition Films | 89.4% | 89.4% | 96.6% | 96.5% |
| Reflection Layer | 82.5% | 96.0% | 96.5% | 97.4% |

The frame 101 may be further formed with a bottom coating layer, a top coating layer 147, an anti-tarnish layer 141, a silicon particle layer 145, and so forth to facilitate coating of the paint for the reflection layer 102 or to protect the reflection layer 102.

The bottom coating layer may include a bottom primer layer 131 and an ultraviolet (UV)-curing layer 135. The bottom primer layer 131 may be formed between the reflection layer 102 and the frame 101, more specifically, on the surface of the frame 101, and the UV-curing layer 135 may be formed on a surface of the bottom primer layer 131 to be positioned between the bottom primer layer 131 and the reflection layer 102.

A surface treatment process for reinforcing affinity of the frame 101 with respect to the paint for the reflection layer 102 may be used to form the bottom primer layer 131 and the UV-curing layer 135. The bottom primer layer 131 and the UV-curing layer 135 are formed by coating a paint including at least one of acryl, urethane, silicon, epoxy, styrene, polyester, and high polymer polyester at least once and are completed by thermally curing or UV-curing the coated paint.

The top coating layer 147 may be intended to protect the reflection layer 102, and may be formed by coating a paint including at least one of acryl, urethane, silicon, epoxy, styrene, polyester, and high polymer polyester at least once and may be completed by thermally curing the coated paint. The top coating layer 147 may be formed on the reflection layer 102, such that it may be positioned between the reflection layer 102 and the display element 105.

The anti-tarnish layer 141 may prevent discoloration of the reflection layer 102 by preventing contamination or oxidation of silver (Ag) and aluminum (Al) which are the main components of the reflection layer 102. To this end, the anti-tarnish layer 141 may be formed on the surface of the reflection layer 102. The anti-tarnish layer 141 may be positioned between the reflection layer 102 and the top coating layer 147.

The silicon particle layer 145 may be formed on the surface of the reflection layer 102 or the surface of the anti-tarnish layer 141 by applying or depositing a paint having silicon dioxide or silicon carbide as its main component. The silicon particle layer 145 suppresses damage of the reflection layer 102 such as a scratch on the surface of the reflection layer 102 and suppresses contamination of the surface of the reflection layer 102 due to a foreign substance or a worker's fingerprint. Moreover, the silicon particle layer 145 can be washed by water even when being contaminated by a foreign substance or a worker's finger print, such that the contamination substance can be easily removed therefrom. Although the silicon particle layer 145 may be formed on the surface of the reflection layer 102 or the surface of the anti-tarnish layer 141 in the present exemplary embodiment of the present invention, it may be formed on the surface of the top coating layer 147.

When the bottom coating layer/the top coating layer 147 or the anti-tarnish layer 141 are formed, a pigment, a dye, a quencher, etc. may be added to the paint to minimize color distortion during reflection, refraction, and penetration of light emitted from a light source. Such addition may be intended to prevent a lighting color from distorting a color implemented by the display element 105.

As mentioned previously, the backlighting device of the display device 100 may include a light guide plate and a sheet diffuser to convert a point light source into a surface light source and uniformly distribute light over the entire area of the display element 105.

The thickness of the display device 100 structured as described above may be reduced by a minimum of 0.14 mm when compared to a display device including a reflection plate manufactured by depositing/stretching deposition films.

While the present invention has been shown and described with reference to certain exemplary embodiments thereof, it will be understood by those skilled in the art that various changes in form and details may be made therein without departing from the spirit and scope of the invention as defined by the appended claims and their equivalents.

For example, in a lighting device in which a reflector is installed behind a light source, such as indoor lighting using a fluorescent lamp or a Light Emitting Diode (LED), outdoor lighting such as a street lamp around a footpath or flood lighting around a road, or vehicle lighting such as a vehicle's headlamp, the reflection layer 102 may be formed. In this case, a frame positioned behind the light source may be manufactured with an injection-molded product or a metal material, and according to the manufacturing material, top/bottom coating layers, an anti-tarnish layer, a silicon particle layer, etc. may be formed to improve the durability of the reflection layer formed on the frame.

What is claimed is:

1. A display device comprising:
a display element for outputting an image according to a provided image signal;
a frame disposed on a rear surface of the display element; and
a reflection layer formed on the frame and positioned between the display device and the frame,
wherein the reflection layer comprises a coating layer formed using a paint comprising at least one of silver and aluminum, and
wherein the frame comprises a plate formed using one of a metal material and an injection-molded product.

2. The display device of claim 1, further comprising a bottom primer layer interposed between the frame and the reflection layer.

3. The display device of claim 2, wherein the bottom primer layer is formed using a paint comprising at least one of acryl, urethane, silicon, epoxy, styrene, polyester, and high polymer polyester.

4. The display device of claim 2, further comprising an ultraviolet (UV)-curing layer interposed between the bottom primer layer and the reflection layer.

5. The display device of claim 4, wherein the UV-curing layer is formed by curing a paint comprising at least one of acryl, urethane, silicon, epoxy, styrene, polyester, and high polymer polyester with UV rays.

6. The display device of claim 1, further comprising a top coating layer formed on the reflection layer and positioned between the display element and the reflection layer.

7. The display device of claim 6, wherein the top coating layer is formed using a paint comprising at least one of acryl, urethane, silicon, epoxy, styrene, polyester, and high polymer polyester.

8. The display device of claim 1, further comprising an anti-tarnish layer coated on a surface of the reflection layer.

9. The display device of claim 1, further comprising a silicon particle layer formed on the reflection layer and positioned between the display element and the reflection layer.

10. The display device of claim 1, further comprising:
a bottom primer layer interposed between the frame and the reflection layer;
an ultraviolet (UV)-curing layer interposed between the bottom primer layer and the reflection layer;
a top coating layer formed on the reflection layer and positioned between the display element and the reflection layer; and
an anti-tarnish layer coated on a surface of the reflection layer,
wherein at least one of the bottom primer layer, the UV-curing layer, the top coating layer, and the anti-tarnish layer are formed using a paint to which at least one of a pigment, a dye, and a quencher are added.

11. A lighting device comprising:
a light source;
a frame provided behind the light source;
a reflection layer formed on the frame; and
an anti-tarnish layer coated on a surface of the reflection layer,
wherein the reflection layer comprises a coating layer formed using a paint comprising at least one of silver and aluminum and reflects light emitted from the light source toward a front side of the lighting device.

12. The lighting device of claim 11, further comprising a bottom primer layer interposed between the frame and the reflection layer.

13. The lighting device of claim 12, wherein the bottom primer layer is formed using a paint comprising at least one of acryl, urethane, silicon, epoxy, styrene, polyester, and high polymer polyester.

14. The lighting device of claim 12, further comprising an ultraviolet (UV)-curing layer interposed between the bottom primer layer and the reflection layer.

15. The lighting device of claim 14, wherein the UV-curing layer is formed by curing a paint comprising at least one of acryl, urethane, silicon, epoxy, styrene, polyester, and high polymer polyester with UV rays.

16. The lighting device of claim 11, further comprising a top coating layer formed on the reflection layer.

17. The lighting device of claim 16, wherein the top coating layer is formed using a paint comprising at least one of acryl, urethane, silicon, epoxy, styrene, polyester, and high polymer polyester.

18. The lighting device of claim 11, further comprising a silicon particle layer formed on the reflection layer.

19. The lighting device of claim 11, further comprising:
a bottom primer layer interposed between the frame and the reflection layer;
an ultraviolet (UV)-curing layer interposed between the bottom primer layer and the reflection layer; and
a top coating layer formed on the reflection layer,
wherein at least one of the bottom primer layer, the UV-curing layer, the top coating layer, and the anti-tarnish layer are formed using a paint to which at least one of a pigment, a dye, and a quencher are added.

* * * * *